United States Patent Office 3,025,217
Patented Mar. 13, 1962

3,025,217
DRY AMYLOPECTIN THERAPEUTIC
DUSTING POWDERS
Harris B. Bernstein and Gilman N. Cyr, New Brunswick, N.J., assignors to Olin Mathieson Chemical Corporation, New York, N.Y., a corporation of Virginia
No Drawing. Filed May 28, 1958, Ser. No. 738,316
3 Claims. (Cl. 167—82)

This invention relates, generally, to new and useful compositions of matter intended for topical application. More particularly, this invention relates to novel compositions which are adapted to be dispensed as dusting powders.

Heretofore some undesirable features have been noticed when pharmacologically active agents (medicaments) have been topically applied to open wounds (lesions) in powder bases such as talc, corn starch and kaolin. These undesirable features include the "caking" of the powder in the lesions, excessive depositing of the powder in said lesions, uneven distribution over the infected area and a "gumming up" of the lesion, all of which contribute to a delay in the normal healing of the wound.

It has now been found that these undesirable features of the heretofore known powder bases can be eliminated by using as the powder base, or vehicle, for the pharmacologically active agent a starch derivative known as amylopectin which is a branched-chain polysaccharide consisting of d-gluco-pyranose units joined by 1–4, alpha linkages with random braches occurring at the 6-carbon position.

It, therefore, is an object of this invention to provide a composition of matter for use as a pharmaceutical preparation for topical application essentially comprising amylopectin and a pharmacologically active agent.

It is a further object of this invention to provide a method of preparing a composition of matter for use as a pharmaceutical preparation for topical application essentially comprising amylopectin and a pharmacologically active agent.

Pharmacologically active agents utilizable in the compositions of this invention when intended for topical application to open wounds (lesions) include, inter alia, antibacterial and antifungal antibiotics, antiseptics, corticosteroids, local anesthetics, and antihistamines; and, when intended for application to intact skin, the pharmacologically active agents utilizable in the compositions of this invention include, inter alia, vitamins, film forming agents (e.g. silicone), astringents and deodorants.

The compositions of this invention are prepared by mixing together the pharmacologically active agent and the amylopectin until thoroughly blended and then comminuting the mixture.

The pharmacologically active agent preferably represents 0.1–50% of the total weight of the composition, the particularly preferred composition containing about 1–10% of the pharmacologically active agent.

The following examples are illustrative, but not limitative, of the invention:

Example I

| | |
|---|---|
| Nystatin (3240 u./mg.) | kg__ 3.4 |
| Neomycin sulfate | gm__ 388.4 |
| Gramicidin | gm__ 27.5 |
| Amylopectin (Stein Hall & Co., Inc., New York 17, N.Y.) q.s. | kg__ 100 |

(a) Gramicidin and an equal weight of neomycin sulfate are placed into a large mortar and mixed until the powders are thoroughly blended. The mixture is then geometrically diluted with the remaining neomycin sulfate until all the neomycin sulfate has been added to said mixture. With the addition of each increment of neomycin sulfate, mixing is continued until a uniform blend has resulted.

(b) The mixture of gramicidin and neomycin sulfate is transferred to a Hobart Mixer. The mixture is then diluted geometrically with nystatin, mixing each increment for about 5 minutes. After the nystatin has been completely added, the mixing is continued for approximately 15 minutes.

(c) To the antibiotic mixture of (b) is added an equal amount of amylopectin mixing continuously for 15 minutes after the addition of each increment. After all the amylopectin has been added, the mixing is continued for 30 minutes until a thorough blending has been achieved.

(d) The blend (c) is then passed through a Fitzpatrick Comminuter operating at high speed and using a double 0 screen.

Example II

| | Gm. |
|---|---|
| Hexachlorophene | 1 |
| Amylopectin, q.s. | 100 |

The hexachlorophene and an equal amount of amylopectin are placed in a mortar and mixed until thoroughly blended. To the mixture is added an equal amount of amylopectin and the geometric addition is continued until the remainder of the amylopectin has been utilized. After each incremental addition, the mixture is mixed thoroughly for 15 minutes. After all the amylopectin has been added the mixing is continued for 30 minutes until the material has been thoroughly blended and then the blend is passed through a Fitzpatrick Comminuter operating at high speed, using a double 0 screen.

Example III

| | Gm. |
|---|---|
| Triamcinolone | 0.1 |
| Amylopectin, q.s. | 100 |

By following the procedure outlined in Example II but substituting the triamcinolone for the hexachlorophene, a triamcinolone-amylopectin composition is obtained.

Example IV

| | Gm. |
|---|---|
| Vitamin A (1,000 units per milligram) | 10 |
| Amylopectin, q.s. | 100 |

By following the procedure of Example II but substituting vitamin A for the hexachlorophene, a vitamin A-amylopectin composition is obtained.

Example V

| | |
|---|---|
| Liquefied phenol | cc__ 1 |
| Amylopectin | gm__ 100 |

The liquefied phenol is thoroughly mixed with 10 gm. of amylopectin in a mortar. To this mixture is added an equal amount of amylopectin and the resulting mixture is thoroughly blended. The geometric addition is continued until all the amylopectin has been added.

Example VI

| | Gm. |
|---|---|
| Hexachlorophene | 0.1 |
| Silicone | 5 |
| Amylopectin, q.s. | 100 |

(a) The silicone is placed in a mortar containing 5 gm. of amylopectin and mixed until thoroughly blended. To this mixture is added the hexachlorophene and the mixture is mixed until thoroughly blended.

(b) To the mixture of (a) is added an equal amount of amylopectin and mixed until thoroughly blended; then the remaining amylopectin is added geometrically until all of the starch derivative has been utilized. Mixing after each additional increment is continued for about 10 minutes; after the last addition of the amylopectin, mixing is continued for about 30 minutes. The final blend is then passed through a Fitzpatrick Comminuter operating at high speed, using a double 0 screen.

The invention may be variously otherwise embodied within the scope of the appended claims.

What is claimed is:

1. A dry dusting powder for topical administration consisting essentially of amylopectin as the only powder vehicle and a topically useful pharmacologically active agent.

2. A composition as in claim 1 wherein the pharmacologically active agent is present in about 0.1–50% of the total weight of the composition.

3. The composition of claim 1 in which the pharmacologically active agent is present in about 1–10% of the total weight of the composition.

References Cited in the file of this patent

UNITED STATES PATENTS

| | | |
|---|---|---|
| 2,726,982 | Ochs | Dec. 13, 1955 |
| 2,758,112 | Waning | Aug. 7, 1956 |
| 2,870,063 | De La Mater | Jan. 20, 1959 |

OTHER REFERENCES

Chemical Abstracts, vol. 24, pp. 5570–1 (1930).

Meyer: Advances in Colloid Science (1942), pp. 157–162.

Remington: Practice of Pharmacy, 9th ed., Mack Publ. Co., Easton, Pa. (1948), p. 297.

Anderson et al.: Chemical Abstracts, vol. 50, col. 6078e, March-April 1956.

U.S. Dispensatory, 25th ed., Lippincott Co., Philadelphia, Pa. (1955), pp. 1308–1311.